US010891014B2

(12) United States Patent
Lee et al.

(10) Patent No.: US 10,891,014 B2
(45) Date of Patent: Jan. 12, 2021

(54) REMOTE VIEW MANIPULATION IN COMMUNICATION SESSION

(71) Applicant: Microsoft Technology Licensing, LLC, Redmond, WA (US)

(72) Inventors: Austin S. Lee, Seattle, WA (US); Angela Chin, Bellevue, WA (US); Hae Jin Lee, Seattle, WA (US); Malek Mohamad Nafez Chalabi, Seattle, WA (US); Sean Michael Lynch, Bellevue, WA (US); Siddhant Mehta, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/927,863

(22) Filed: Mar. 21, 2018

(65) Prior Publication Data
US 2019/0294313 A1 Sep. 26, 2019

(51) Int. Cl.
*G06F 40/143* (2020.01)
*G06F 3/0481* (2013.01)
(Continued)

(52) U.S. Cl.
CPC ........ *G06F 3/04815* (2013.01); *G06F 3/0346* (2013.01); *G06F 3/04845* (2013.01);
(Continued)

(58) Field of Classification Search
CPC . H04L 12/1822; H04L 12/18; H04L 12/1813; H04L 65/40; G06F 3/011;
(Continued)

(56) References Cited

U.S. PATENT DOCUMENTS 6,559,863 B1 * 5/2003 Megiddo ............. H04L 12/1827
348/14.08
8,698,874 B2 * 4/2014 Watson .................... H04N 7/15
345/619

(Continued)

OTHER PUBLICATIONS

"International Search Report and Written Opinion Issued in PCT Application No. PCT/US2019/021728", dated May 24, 2019, 18 Pages.

*Primary Examiner* — Wilson W Tsui
(74) *Attorney, Agent, or Firm* — Newport IP, LLC; Mike R. Cicero

(57) ABSTRACT

Disclosed techniques enable participants of a communication session that is rendered within a mixed reality environment to change their view or perspective in the mixed reality environment. The participants may alter their view or perspective in the mixed reality environment using a data processing device displaying the communication session. The participant may interact with a data processing device displaying the communication session to cause the change in their view or perspective in the mixed reality environment. The participant interaction may include user touch and/or gestures with an associated data processing device to cause the change in the participant's view or perspective in the mixed reality environment. The participant may use a plurality of fingers on a display of the data processing device to zoom, pan or rotate their view or perspective in the mixed reality environment. Also, the participant may move the data processing device to cause their view or perspective in the mixed reality environment to change.

18 Claims, 8 Drawing Sheets

(51) Int. Cl.
*G06T 19/00* (2011.01)
*G06F 3/0346* (2013.01)
*G06F 3/0484* (2013.01)
*G06F 3/0488* (2013.01)
*G06F 3/14* (2006.01)
*H04L 29/06* (2006.01)
*G09G 3/00* (2006.01)
*G06F 3/048* (2013.01)

(52) U.S. Cl.
CPC ............ *G06F 3/04883* (2013.01); *G06F 3/14* (2013.01); *G06T 19/006* (2013.01); *G06F 3/048* (2013.01); *G09G 3/003* (2013.01); *G09G 2340/04* (2013.01); *G09G 2340/12* (2013.01); *G09G 2340/14* (2013.01); *G09G 2354/00* (2013.01); *H04L 65/40* (2013.01)

(58) Field of Classification Search
CPC ...... G06F 3/013; G06F 3/04815; G06F 3/017; G06F 3/0346; G06F 3/048; G06F 3/04845; G06F 3/04883; G06F 3/14; G06T 19/006; G06G 3/003; G06G 2340/04; G06G 2340/12; G09G 2340/14; G09G 2354/00
See application file for complete search history.

(56) References Cited

U.S. PATENT DOCUMENTS

| | | | |
|---|---|---|---|
| 9,007,427 B2* | 4/2015 | Hoover | H04N 7/157 348/14.07 |
| 9,769,422 B2* | 9/2017 | Rosenberg | H04N 7/15 |
| 10,165,261 B2* | 12/2018 | Valdivia | H04L 51/16 |
| 2005/0093971 A1* | 5/2005 | Ono | H04N 7/15 348/14.09 |
| 2005/0237376 A1* | 10/2005 | Roessler | H04N 7/15 348/14.04 |
| 2011/0267422 A1* | 11/2011 | Garcia | H04N 7/15 348/14.16 |
| 2014/0340465 A1* | 11/2014 | Shi | H04N 7/15 348/14.03 |
| 2017/0237940 A1* | 8/2017 | Chaney | H04N 13/383 348/14.07 |
| 2017/0318262 A1 | 11/2017 | Safaei et al. | |
| 2017/0339372 A1 | 11/2017 | Valli | |

* cited by examiner

REMOTE VIEW MANIPULATION IN COMMUNICATION SESSION

BACKGROUND

A networked meeting represents one popular form of electronic collaboration that facilitates communication between two or more participants present at separate physical locations. Participants of a communication session in a networked meeting are able to exchange live video, audio, and other data to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

Technologies and infrastructures that provide the networked meetings have recently implemented mixed reality technologies, which may include virtual reality technologies and augmented reality technologies. Augmented reality and virtual reality technologies provide an immersive computing experience by allowing a user to interact with computer-generated objects and, in some cases, navigate in a computer-generated world. Augmented reality overlays a view of the physical, real-world environment with computer-generated objects that provide information and allows for interactions with the computer-generated objects in the physical, real-world environment. Virtual reality provides a simulated environment where a user can interact with computer-generated objects and/or move around in the simulated environment. Network meetings that implement mixed reality technologies may generate immersive communication sessions in which participants are represented in an immersive mixed reality environment.

A networked meeting that implements a mixed reality technology may include a mixed reality environment that is provided by a host of the networked meeting. For example, the host of the network meeting may use a head mounted display (HMD) to generate the mixed reality environment. Participants of the network meeting may be associated with the mixed reality environment. Specifically, communication session data, such as video, audio, and/or other media, of or from the participants may be rendered in the mixed reality environment. Therefore, in some implementations, the mixed reality environment provided by the host of the networked meeting may include a plurality of video or other image representations associated with participants of the networked meeting.

Known networked meeting technologies that implement mixed reality technologies generally do not allow remote participants to modify or change the participant's view or perspective within the mixed reality environment. For example, video, audio, and/or other media representing a participant may be rendered within a mixed reality environment of a communication session. Known techniques do not allow the participants of the communication session to alter and/or change a perspective or point of view of the video, audio, and/or other media rendered within the environment of the communication session. Rather, a host of the networked meeting implementing mixed reality technology may be responsible for modifying or changing the participant's view or perspective within the mixed reality environment. Alternatively, some known networked meeting technologies that implement mixed reality technologies synchronize the participant's view or perspective within the mixed reality environment to the view of the host of the networked meeting. For example, the perspective or point of view of participant provided video, audio, and/or other media rendered within the environment is generally modifiable by the host of the networked meeting and/or the perspective or point of view is synchronized to the host's perspective or point of view. Therefore, known networked meeting technologies that implement graphical environments in which participant representations are rendered do not provide a realistic representation of participant interaction and involvement associated with a communication session.

SUMMARY

Disclosed techniques enable participants of a communication session that is rendered within a mixed reality environment to change their view or perspective in the mixed reality environment. The participants may alter their view or perspective in the mixed reality environment using a data processing device displaying the communication session. The participant may interact with a data processing device displaying the communication session to cause the change in their view or perspective in the mixed reality environment. The participant interaction may include user touch and/or gestures with an associated data processing device to cause the change in the participant's view or perspective in the mixed reality environment. The participant may use a plurality of fingers on a display of the data processing device to zoom, pan or rotate their view or perspective in the mixed reality environment. Also, the participant may move the data processing device to cause their view or perspective in the mixed reality environment to change. Allowing participants to change their view or perspective in the mixed reality environment enhances how user interactions within the communication session are represented.

In some implementations, participants of the communication session that is rendered within a mixed reality environment may be rendered as video cards, avatars, images, or the like, that represent the participants. The rendered video cards, avatars and/or images may be shown as floating or hovering within the mixed reality environment. The data transmission network facilitating the communication session may adjust the representation of the rendered video cards, avatars and/or images when a participant interacts with their data processing device displaying the communication session. For example, in some implementations, the participant may interact with their data processing device to cause a change in their view or perspective in the mixed reality environment. This interaction may cause the rendered video cars, avatars and/or images to change position, and large, shrink, or the like. In some implementations, the rendered video cards, avatars and/or images may undergo a change in point of view within the mixed reality environment. For example, the rendered video cards, avatars and/or images may be shown as rotated or tilted within the mixed reality environment to show that the participant has interacted with their data processing device in a particular manner and/or has altered their view or perspective within the mixed reality environment. In other implementations, the rendered video cards, avatars and/or images may be caused to enlarge or shrink to represent that the participant has interacted with the data processing device in a particular manner and/or altered their view or perspective within the mixed reality environment.

Furthermore, in some implementations, a system is provided that includes one or more processors, and a computer-readable medium having encoded thereon computer-executable instructions to cause the one or more processors to perform at least the following functions. Those functions include causing display, on one or more data processing devices connected to a communication session via a data transmission network, of a graphical environment comprising at least one graphical representation of a participant associated with the communication session, and receiving data, from the one or more data processing devices connected to the communication session, indicating the participant associated with the communication session has modified their view of the graphical environment. Furthermore, the instructions may cause the one or more processors to, in response to receiving the data, cause the at least one graphical representation of the participant associated with the communication session to change within the graphical environment.

In some implementations, a system may include means to cause display, on one or more data processing devices connected to a communication session via a data transmission network, of a graphical environment comprising at least one graphical representation of a participant associated with the communication session, and means to receive data, from the one or more data processing devices connected to the communication session, indicating the participant associated with the communication session has modified their view of the graphical environment. Furthermore, the system may, in response to receiving the data, means to cause the at least one graphical representation of the participant associated with the communication session to change within the graphical environment.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
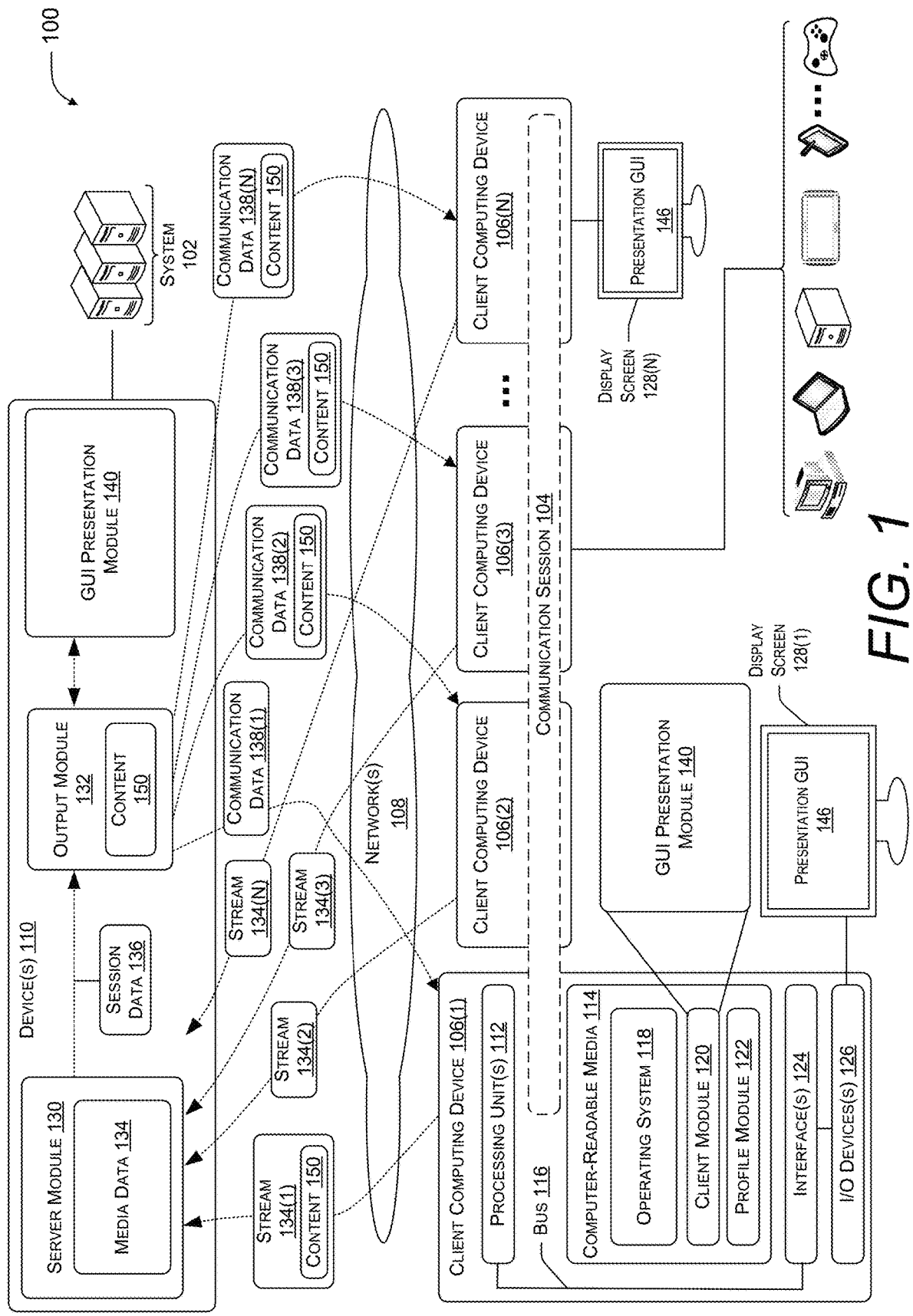
FIG. 1 is a diagram illustrating an example environment in which a system can operate to populate a graphical user interface (GUI) with multidimensional environments, video content, image content and/or presentation content.

Various techniques disclosed herein enable participants of a communication session that is rendered within a mixed reality environment to change their view or perspective in the mixed reality environment. The communication session may be provided via a data transmission network. The mixed reality environment may be an augmented reality or virtual reality environment. In some implementations, the participants may alter their view or perspective in the mixed reality environment using a data processing device, such as a mobile device or a desktop computer, displaying the communication session. For example, the participant may interact with the data processing device displaying the communication session to cause the change in their view or perspective in the mixed reality environment. The participant interaction may include user touch and/or gestures with an associated data processing device to cause the change in the participant's view or perspective in the mixed reality environment. For example, in some implementations, the participant may use a plurality of fingers on a display of the data processing device to zoom, pan or rotate their view or perspective in the mixed reality environment. In other implementations, the participant may move the data processing device to cause their view or perspective in the mixed reality environment to change.

In some implementations, participants of the communication session that is rendered within a mixed reality environment may be rendered as video cards, avatars, images, or the like, that represent the participants. The rendered video cards, avatars and/or images may be shown as floating or hovering within the mixed reality environment. The data transmission network facilitating the communication session may adjust the representation of the rendered video cards, avatars and/or images when a participant interacts with their data processing device displaying the communication session to cause the change in their view or perspective in the mixed reality environment. Specifically, in some implementations, the rendered video cards, avatars and/or images may undergo a change in point of view within the mixed reality environment. For example, the rendered video cards, avatars and/or images may be shown as rotated or tilted within the mixed reality environment to show that a participant has altered their view or perspective within the mixed reality environment. In other implementations, the rendered video cards, avatars and/or images may be caused to enlarge or shrink to represent that a participant has altered their view or perspective within the mixed reality environment.

In some implementations, a computer implemented method may include causing display, on one or more data processing devices connected to a communication session via a data transmission network, of a graphical environment comprising at least one graphical representation of a participant associated with the communication session, and receiving data, from the one or more data processing devices connected to the communication session, indicating the participant associated with the communication session has modified their view of the graphical environment. Furthermore, the computer implemented method may include in response to receiving the data, causing the at least one graphical representation of the participant associated with the communication session to change within the graphical environment.

In some implementations, participants of the communication session that is rendered within a mixed reality environment may be rendered as video cards, avatars, images, or the like, that represent the participants. The rendered video cards, avatars and/or images may be shown as floating or hovering within the mixed reality environment. The data transmission network facilitating the communication session may adjust the representation of the rendered video cards, avatars and/or images when a participant interacts with their data processing device displaying the communication session to cause the change in their view or perspective in the mixed reality environment. Specifically, in some implementations, the rendered video cards, avatars and/or images may undergo a change in point of view within the mixed reality environment. For example, the rendered video cards, avatars and/or images may be shown as rotated or tilted within the mixed reality environment to show that a participant has altered their view or perspective within the mixed reality environment. In other implementations, the rendered video cards, avatars and/or images may be caused to enlarge or shrink to represent that a participant has altered their view or perspective within the mixed reality environment.

Furthermore, in some implementations, a system is provided that includes one or more processors, and a computer-readable medium having encoded thereon computer-executable instructions to cause the one or more processors to perform at least the following functions. Those functions include causing display, on one or more data processing devices connected to a communication session via a data transmission network, of a graphical environment comprising at least one graphical representation of a participant associated with the communication session, and receiving data, from the one or more data processing devices connected to the communication session, indicating the participant associated with the communication session has modified their view of the graphical environment. Furthermore, the instructions may cause the one or more processors to, in response to receiving the data, cause the at least one graphical representation of the participant associated with the communication session to change within the graphical environment.

In some implementations, a system may include means to cause display, on one or more data processing devices connected to a communication session via a data transmission network, of a graphical environment comprising at least one graphical representation of a participant associated with the communication session, and means to receive data, from the one or more data processing devices connected to the communication session, indicating the participant associated with the communication session has modified their view of the graphical environment. Furthermore, the system may, in response to receiving the data, means to cause the at least one graphical representation of the participant associated with the communication session to change within the graphical environment.

Various examples, implementations, scenarios, and aspects are described below with reference to FIGS. 1 through 8.

FIG. 1 is a diagram illustrating an example environment 100 in which a system 102 can operate to populate a graphical user interface (GUI) with video content, image content and/or presentation content. In some implementations, the GUI may display a mixed reality environment. The mixed reality environment may be a virtual reality and/or augmented reality environment. In some implementations, the mixed reality environment associated with the GUI is part of a communication session 104. The communication session 104 may include one or more participants associated with the communication session 104. Representations of the participants associated with the communication session 104 may be displayed within the GUI as video cards, avatars, images, and the like. The representations of the participants may be displayed as hovering or floating within the mixed reality environment associated with the GUI. The video cards, avatars, images, and the like, may be rotated, tilted, moved, enlarge, shrunk, and the like, to represent a modification of the view or perspective associated with one or more participants of the communication session 104.

As illustrated, the communication session 104 may be implemented between a number of client computing devices 106(1) through 106(N) (where N is a positive integer number having a value of two or greater) that are associated with the system 102 or are part of the system 102. The client computing devices 106(1) through 106(N) enable users, also referred to as participants and individuals, to participate in the communication session 104.

In this example, the communication session 104 is hosted, over one or more network(s) 108, by the system 102. That is, the system 102 can provide a service that enables users of the client computing devices 106(1) through 106(N) to participate in the communication session 104 (e.g., via a live viewing and/or a recorded viewing). Consequently, a "participant" to the communication session 104 can comprise a user and/or a client computing device (e.g., multiple users may be in a communication room participating in a communication session via the use of a single client computing device), each of which can communicate with other participants. As an alternative, the communication session 104 can be hosted by one of the client computing devices 106(1) through 106(N) utilizing peer-to-peer technologies. The system 102 can also host chat conversations and other team collaboration functionality (e.g., as part of an application suite). In one example, a chat conversation can be conducted in accordance with the communication session 104. Additionally, the system 102 may host the communication session 104, which includes at least a plurality of participants co-located at a meeting location, such as a meeting room or auditorium.

In examples described herein, client computing devices 106(1) through 106(N) participating in the communication session 104 are configured to receive and render for display, on a user interface of a display screen, communication data. The communication data may be rendered within a three-dimensional environment, such as an environment associated with a mixed reality environment including augmented reality and/or virtual reality environment. The three-dimensional environment may be captured by one or more mixed reality technologies associated with the example environment 100. Such mixed reality technologies include one or more head mounted displays and headsets. Known mixed reality technologies include Microsoft Hololens, Google Glass, Oculus Rift, and Meta 2. Mixed reality technologies may be implemented by one or more of the system 102, devices 110, and/or client computing devices 106.

The communication data can comprise a collection of various instances, or streams, of live content and/or recorded content. The collection of various instances, or streams, of live content and/or recorded content may be provided by one or more cameras, such as video cameras, and/or the described mixed reality technologies. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 104 live as activity occurs, or alternatively, via a recording at a later time after the activity occurs. In examples described herein, client computing devices 106(1) through 106(N) participating in the communication session 104 are configured to receive and render for display, on a user interface of a display screen, communication data. The communication data may be rendered within a mixed reality environment, where the mixed reality environment is provided by a mixed reality technology, such as one or more head mounted displays, associated with the environment 100. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, or other data processing device, etc.) viewing the shared content of a communication session alone in their office or at home.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more communication sessions, such as the communication session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Furthermore, device(s) 110 may be one or more head mounted displays that render three-dimensional environments, including mixed reality environments that include virtual reality environments and/or augmented reality environments. Thus, although illustrated as a single type of device or a server-type device, device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Furthermore, client computing device may be one or more head mounted displays that render three-dimensional environments, including mixed reality environments that include virtual reality environments and/or augmented reality environments. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a mixed reality device, a virtual reality device, an augmented reality device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more data processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by data processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 1 illustrates that client computing device 106(1) is in some way connected to a display device (e.g., a display screen 128(1)), which can display a GUI according to the techniques described herein.

In the example environment 100 of FIG. 1, client computing devices 106(1) through 106(N) may use their respective client modules 120 to connect with one another and/or other external device(s) in order to participate in the communication session 104, or in order to contribute activity to a collaboration environment. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles (not shown in FIG. 1), and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 1, the device(s) 110 of the system 102 includes a server module 130 and an output module 132. In this example, the server module 130 is configured to receive, from individual client computing devices such as client computing devices 106(1) through 106(N), media streams 134(1) through 134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(N) during a live viewing of the communication session 104 (the collection being referred to herein as media data 134). In some scenarios, not all the client computing devices that participate in the communication session 104 provide a media stream. For example, a client computing device may only be a consuming, or a "listening", device such that it only receives content associated with the communication session 104 but does not provide any content to the communication session 104.

In various examples, the server module 130 can select aspects of the media data 134 that are to be shared with individual ones of the participating client computing devices 106(1) through 106(N). Consequently, the server module 130 may be configured to generate session data 136 based on the streams 134 and/or pass the session data 136 to the output module 132. Then, the output module 132 may communicate communication data 138 to the client computing devices (e.g., client computing devices 106(1) through 106(3) participating in a live viewing of the communication session). The communication data 138 may include video, audio, and/or other content data, provided by the output module 132 based on content 150 associated with the output module 132 and based on received session data 136. As shown, the output module 132 transmits communication data 138(1) to client computing device 106(1), and transmits communication data 138(2) to client computing device 106(2), and transmits communication data 138(3) to client computing device 106(3), etc. The communication data 138 transmitted to the client computing devices can be the same or can be different (e.g., positioning of streams of content within a user interface may vary from one device to the next).

In various implementations, the device(s) 110 and/or the client module 120 can include GUI presentation module 140. The GUI presentation module 140 may be configured to analyze communication data 138 that is for delivery to one or more of the client computing devices 106. Specifically, the GUI presentation module 140, at the device 110 and/or the client computing device 106, may analyze communication data 138 to determine an appropriate manner for displaying video, image, and/or content on the display screen 128 of an associated client computing device 106. In some implementations, the GUI presentation module 140 may provide video, image, and/or content to a presentation GUI 146 rendered on the display screen 128 of the associated client computing device 106. The presentation GUI 146 may be caused to be rendered on the display screen 128 by the GUI presentation module 140. The presentation GUI 146 may include the video, image, and/or content analyzed by the GUI presentation module 140.

In some implementations, the presentation GUI 146 may include one or more sections or grids that may render or comprise video, image, and/or content for display on the display screen 128, such as a multidimensional environment that includes communication session data. The GUI presentation module 140 may populate the presentation GUI 146 in a manner that properly imitates an environment experience that the presenter and the individual may be sharing. In some implementations, the GUI presentation module 140 may enlarge or provide a zoomed view of the individual represented by the video feed in order to highlight a reaction, such as a facial feature, the individual had to the presenter. In some implementations, the presentation GUI 146 may include a video feed of a plurality of participants associated with a meeting, such as a general communication session. In other implementations, the presentation GUI 146 may be associated with a channel, such as a chat channel, enterprise teams channel, or the like. Therefore, the presentation GUI 146 may be associated with an external communication session that is different than the general communication session.

Figure 2:
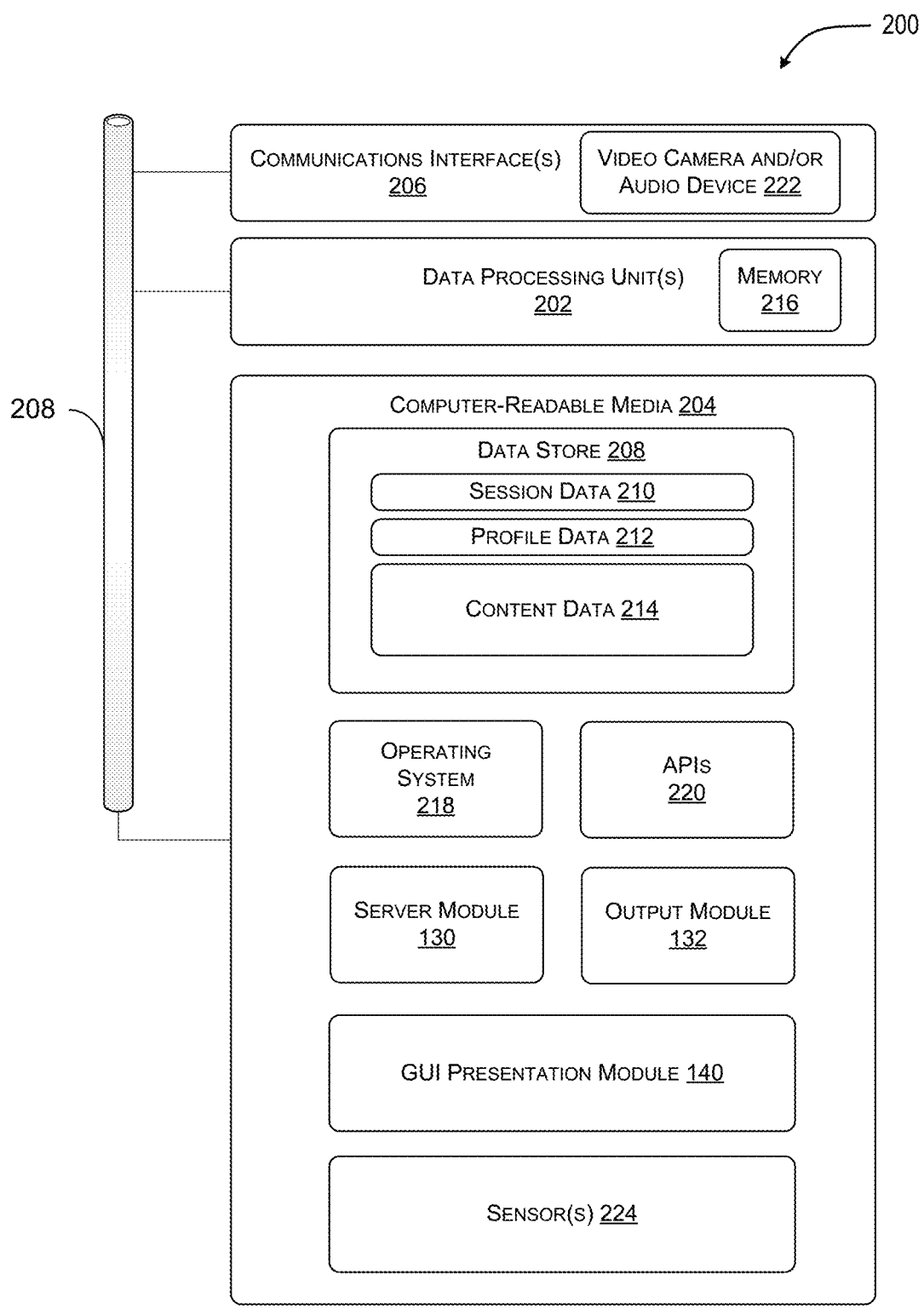
FIG. 2 illustrates a diagram that shows example components of an example device configured to populate the presentation GUI that may include one or more sections or grids that may render or comprise multidimensional environments, video, image, and/or content for display on the display screen.

FIG. 2 illustrates a diagram that shows example components of an example device 200 configured to populate the presentation GUI 146 that may include one or more sections or grids that may render or comprise multidimensional environments, video, image, and/or content for display on the display screen 128. The device 200 may represent one of device(s) 110. Additionally, or alternatively, the device 200 may represent one of the client computing devices 106. As illustrated, the device 200 includes one or more data processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, data processing unit(s), such as the data processing unit(s) 202 and/or data processing unit(s) 112, may represent, for example, a CPU-type data processing unit, a GPU-type data processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. Furthermore, the communication interface(s) 206 may include one or more video cameras and/or audio devices 222 to enable generation of video feeds and/or still images, and so forth.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by data processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in a communication session, activity that occurs in the communication session, a list of invitees to the communication session, and/or other data related to when and how the communication session is conducted or hosted. The data store 208 may also include content data 214, such as the content 150 that includes video, audio, or other content for rendering and display on one or more of the display screens 128.

Alternately, some or all of the above-referenced data can be stored on separate memories 216 on board one or more data processing unit(s) 202 such as a memory on board a CPU-type processor, a GPU-type processor, an FPGA-type accelerator, a DSP-type accelerator, and/or another accelerator. In this example, the computer-readable media 204 also includes operating system 218 and application programming interface(s) 220 configured to expose the functionality and the data of the device 200 to other devices. Additionally, the computer-readable media 204 includes one or more modules such as the server module 130, the output module 132, and the GUI presentation module 140, although the number of illustrated modules is just an example, and the number may vary higher or lower. That is, functionality described herein in association with the illustrated modules may be performed by a fewer number of modules or a larger number of modules on one device or spread across multiple devices.

The device 200 may include one or more sensors 224. For example, the device 200 may include an accelerometer sensor. Furthermore, the device 200 may include one or more gyroscopes, and/or magnetometers. The accelerometer sensor may be a 3D accelerometer, Micro-Electro-Mechanical Systems (MEMS) accelerometer, an electromechanical accelerometer, piezoelectric accelerometer, piezoresistive accelerometer, magnetoresistive accelerometer, capacitive accelerometer, accelerometers that use the Hall effect and/or heat transfer, and/or other accelerometers. The accelerometer sensor may be coupled to one or more components of the device 200. Therefore, the accelerometer sensor may measure acceleration data (e.g., orientation, movement and/or acceleration) of the device 200 and/or one or more components of the device 200. For example, an accelerometer may determine if the device 200 is moving and/or at an angle. Acceleration data provided by the accelerometer sensor may be used to measure gravity, position, velocity, angular velocity, and/or negative or positive acceleration.

The one or more sensors 224 may be coupled to the data processing unit 202. For example, the accelerometer sensor may be coupled to the data processing unit 202. Data compiled by the accelerometer sensor may be communicated to the data processing unit 202. The data processing unit 202 may analyze the data from the accelerometer sensor to determine, for example, orientation, 3-D coordinates, movement, etc. associated with the device 200 and/or components of the device 200. In some implementations, the determined orientation, 3-D coordinates, movement, etc., may be leveraged as part of displaying representations of the participants, associated with the communication session 104, within a mixed reality environment, augmented reality environment, and the like. As disclosed, the representations of the participants may be displayed as hovering or floating within the mixed reality environment associated with the GUI. The video cards, avatars, images, and the like, may be rotated, tilted, moved, enlarge, shrunk, and the like, to represent a modification of the view or perspective associated with one or more participants of the communication session 104. The determined orientation, 3-D coordinates, movement, etc. may control the amount of rotation, tilt, movement, size change, etc., associated with the video cards, avatars, images and the like rendered within the mixed reality environment associated with the GUI.

Figure 3:
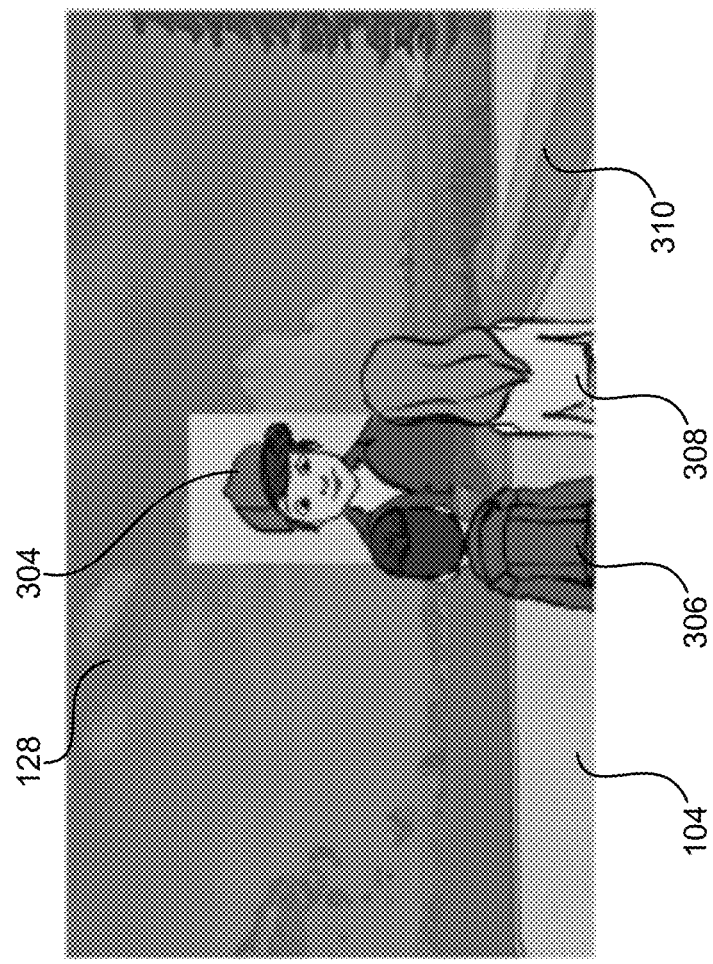
FIG. 3 illustrates components associated with data processing devices, such as computing devices associated with the environment illustrated in FIG. 1, that may be used to facilitate remote view manipulation of a stream rendered within a graphical environment.
Figure 3:
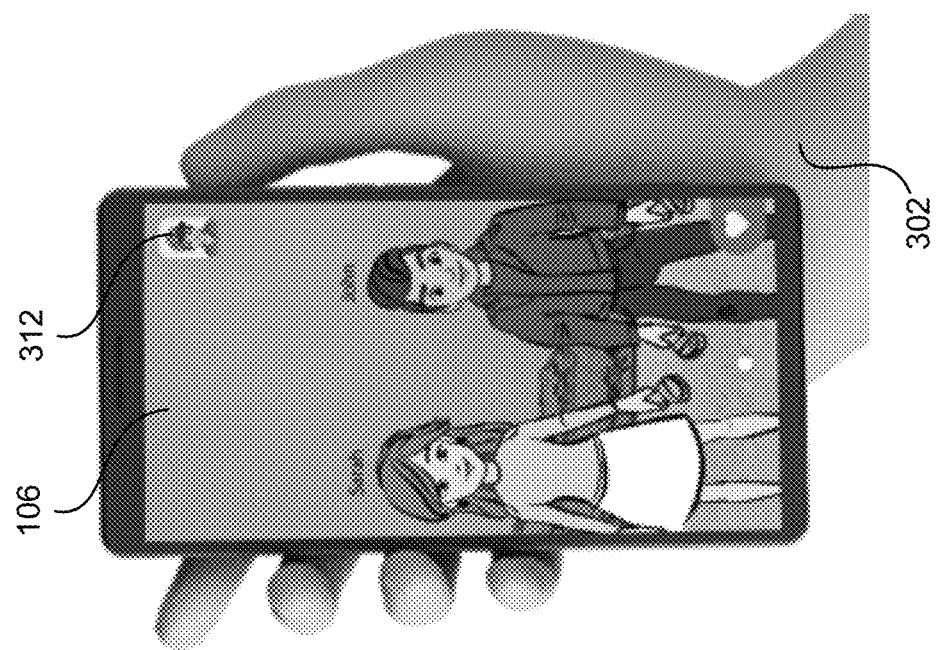

FIG. 3 illustrates components associated with data processing devices, such as computing devices associated with the environment 100, that may be used to facilitate remote view manipulation of a stream rendered within a graphical environment. As illustrated, a computing device 106 may be held in a hand 302 of a participant associated with an ongoing communication session 104. The computing device 106 may obtain video of the participant and stream the video to the ongoing communication session 104. The streamed video is represented as a video card 304 within the ongoing communication session 104. The video card 304 may provide a live video feed obtained from the computing device 106. In other implementations, the video card 304 may display a static image of the participant holding the computing device 106. In some implementations, the video card 304 may be an avatar, such as a graphical image, associated with the participant holding the computing device 106. In some implementations, the video card 304 may hover or float (as illustrated) in the communication session 104 graphical environment.

In the implementation illustrated in FIG. 3, three participants are associated with the ongoing communication session 104. However, the number of participants shown in the ongoing communication session 104 is merely exemplary. In this example, the video card 304 is associated with the participant holding the computing device 106. The two other participants 306 and 308 may similarly be engaged with their own computing device 106. Specifically, the participants 306 and 308 may be using their own computing device 106 to stream video to the ongoing communication session 104. The streamed video may be in the form of a live video stream rendered as a video card in the communication session 104, a static image rendered as a video card in the communication session 104, an avatar (as illustrated) rendered in the communication session 104, and the like. In some implementations, a view 312 of the participant holding the computing device 106 is part of the graphical user interface associated with the computing device 106.

The communication session 104 may comprise, as illustrated, a graphical environment 310 in which the participants of the communication session 104 are rendered. In some implementations, the graphical environment 310, as shown, may be a multidimensional graphical environment. For example, in some implementations, the multidimensional graphical environment may be provided by mixed reality technology, such as virtual reality technology and/or augmented reality technology. Therefore, the multidimensional graphical environment may be a three-dimensional graphical environment in which representations of the participants of the communication session 104 are rendered.

The graphical environment 310 of the communication session 104 may be provided by one or more of the components of the example environment 100. In some implementations, the graphical environment 310 of the communication session 104 is provided by at least one of the participants of the communication session 104. For example, a participant of the communication session 104 may provide the graphical environment 310 via a head mounted display, or the like. That is, the computing device 200, computing device 106, system 102, devices 110, and the like, may be embodied as a head mounted display or other device for providing the multidimensional graphical environment associated with the communication session 104. In some implementations, the communication session 104 is at least in part hosted by one or more components of the example environment 100. Therefore, the example environment 100 and components associated therewith may provide instructions to participant computing devices (e.g., computing devices 106) that cause the computing devices to display the graphical environment 310. Moreover, the example environment 100 and components associated therewith may receive data and/or information indicating that one or more participants of the ongoing communication session 104 has modified their view of the graphical environment 310 (shown in subsequent figures). Specifically, a computing device 106, associated with a participant of the communication session 104, may convey data to the example environment 100 that indicates that a participant using the computing device 106 has initiated modifying their view of the graphical environment 310. In response to receiving the conveyed data, the example environment 100 and the components associated therewith may cause a representation (e.g., the video card 304) of the participant within the graphical environment 310 to change position. For example, a point of view of the representation of the participant within the graphical environment 310 may be modified or changed to show that the participant has modified their view of the graphical environment 310.

Figure 4:
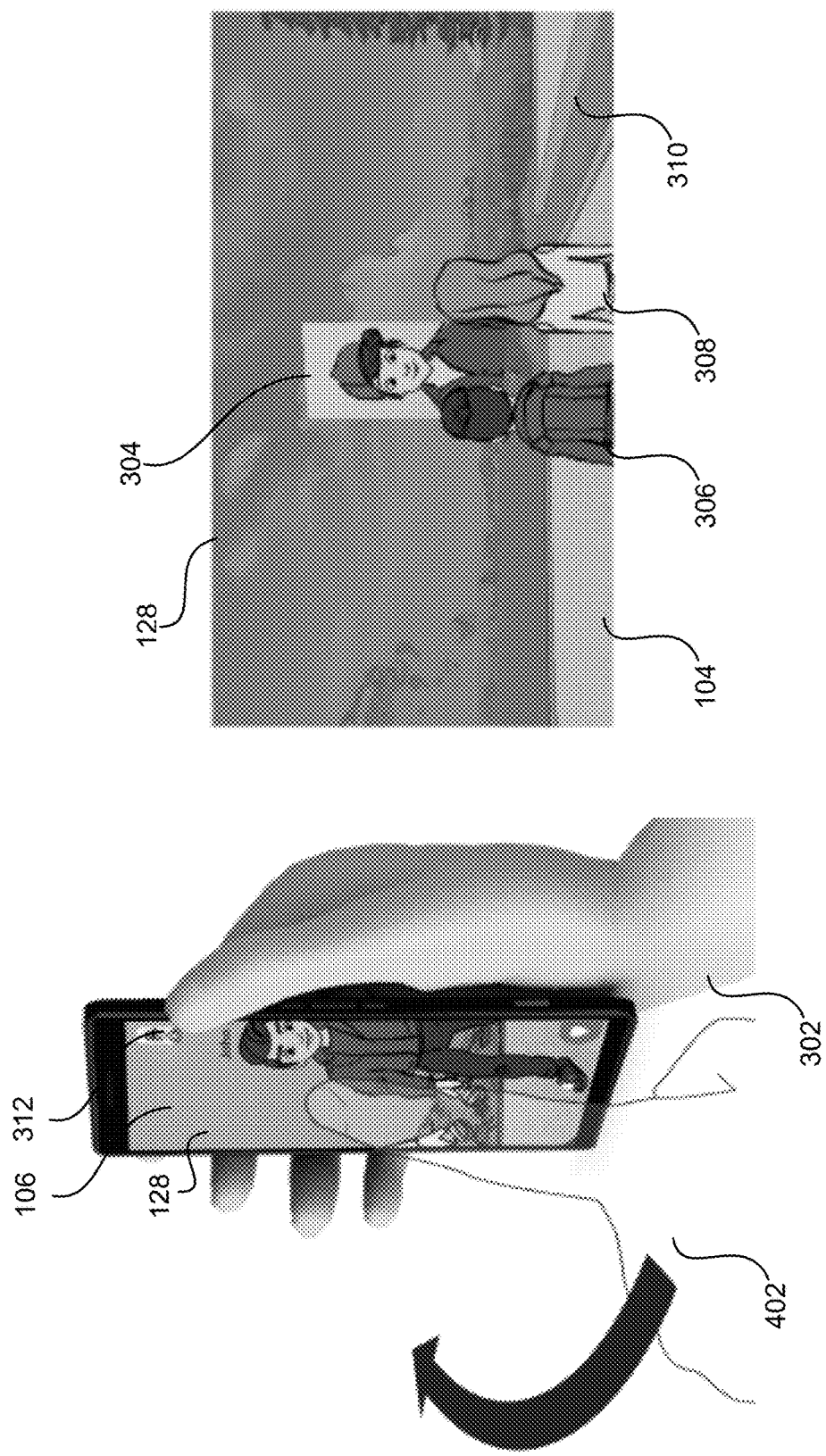
FIG. 4 illustrates an exemplary remote view manipulation of a stream rendered within the graphical environment illustrated in FIG. 3.

FIG. 4 illustrates an exemplary remote view manipulation of a stream rendered within the graphical environment 310 illustrated in FIG. 3. Specifically, FIG. 4 illustrates that the participant associated with the ongoing communication session 104 is using their computing device 106 to cause the video card 304 to change position within the graphical environment 310. As shown in FIG. 4, the video card 304 has been rotated to at least partially face the participant 306. Therefore, a point of view of the video card 304 has changed.

In this example, to cause the video card 304 to change position within the graphical environment 310, the participant places at least one finger 402 or other conductive surface on the screen 128 of the computing device 106. The participant may then rotate (i.e., gesture action) the computing device 106 to cause the video card 304 to rotate. An accelerometer or other sensor, such as an image sensor, associated with the computing device 106 may detect the rotation of the computing device 106. For example, the accelerometer may obtain orientation data related to the rotation of the computing device 106. The orientation data may be used to determine an amount of rotation associated with the video card 304.

The participant may release or remove the at least one finger 402 or other conductive surface from the screen 128 to lock the video card 304 in the rotated position. Specifically, removing the at least one finger or other conductive surface from the screen 128 allows the participant to position or move the computing device 106 without changing the rotated position of the video card 304 within the graphical environment 310. As illustrated, the video card 304 illustrated in the graphical environment 310 has been rotated to show that the participant holding the computing device 106 desires to show that they are looking at the participant 306.

Figure 5:
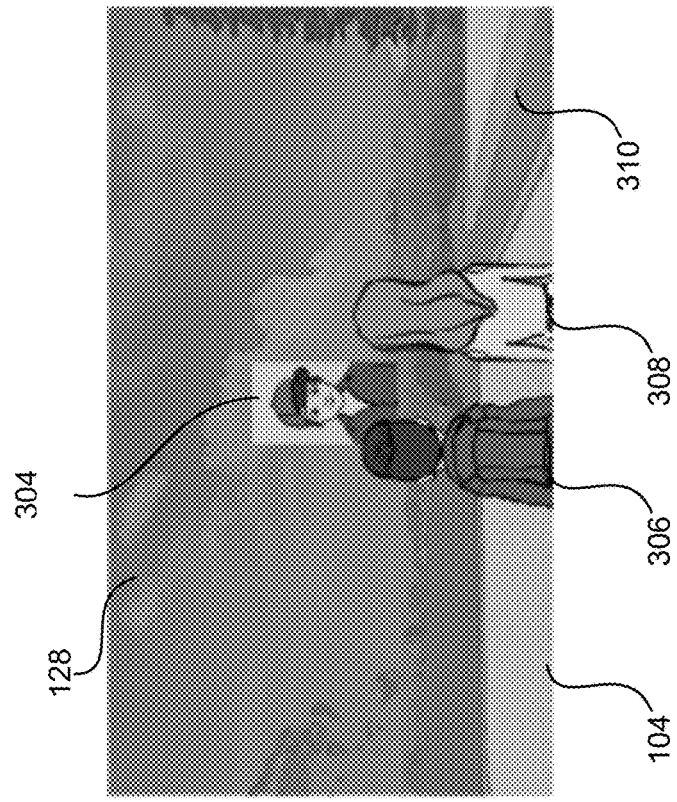
FIG. 5 illustrates another exemplary remote view manipulation of a stream rendered within the graphical environment illustrated in FIG. 3.
Figure 5:
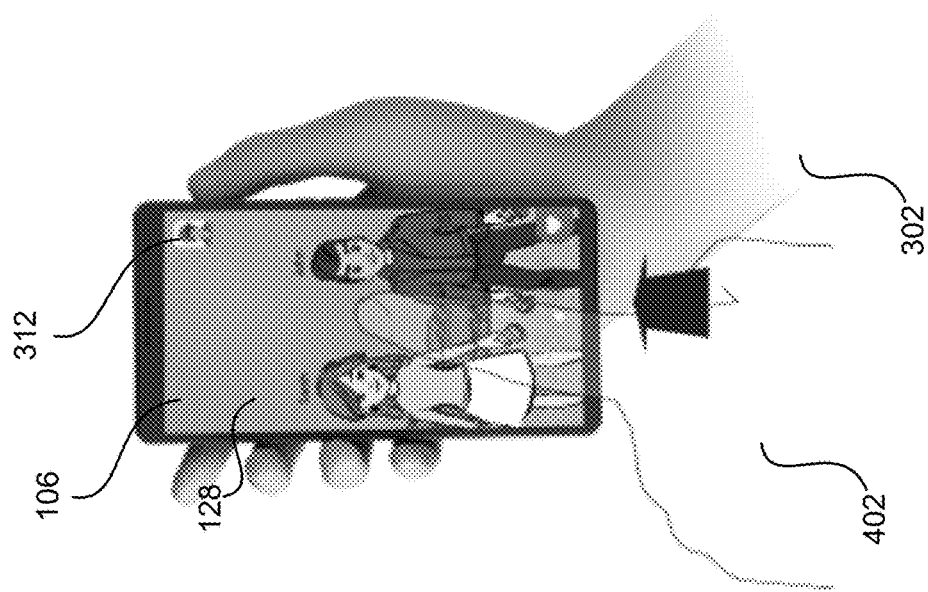

FIG. 5 illustrates another exemplary remote view manipulation of a stream rendered within the graphical environment 310 illustrated in FIG. 3. Specifically, FIG. 5 illustrates that the participant associated with the ongoing communication session 104 is using their computing device 106 to cause the video card 304 to change position within the graphical environment 310. As shown in FIG. 5, the video card 304 has been made smaller, compared to the video card 304 illustrated in FIG. 3. Therefore, a point of view of the video card 304 has changed.

In this example, to cause the video card 304 to change position within the graphical environment 310, the participant places at least one finger 402 or other conductive surface on the screen 128 of the computing device 106. The participant may then push or move (i.e., gesture action) the computing device 106 outward to similarly cause the video card 304 to become smaller. An accelerometer or other sensor, such as an image sensor, associated with the computing device 106 may detect the movement of the computing device 106. For example, the accelerometer may obtain position data related to the movement of the computing device 106. The position data may be used to determine an amount of movement associated with the video card 304.

The participant may release or remove the at least one finger 402 or other conductive surface from the screen 128 to lock the video card 304 at the desired position. Specifically, removing the at least one finger or other conductive surface from the screen 128 allows the participant to position or move the computing device 106, without changing the size of the video card 304 within the graphical environment 310.

In a similar manner, the participant may place the at least one finger 402 or other conductive surface on the screen 128 of the computing device 106, and simultaneously move (i.e., gesture action) the computing device 106 inward to cause the video card 304 to become larger. An accelerometer or other sensor, such as an image sensor, associated with the computing device 106 may detect the movement of the computing device 106. For example, the accelerometer may obtain position data related to the movement of the computing device 106. The position data may be used to determine an amount of movement associated with the video card 304.

The participant may release or remove the at least one finger 402 or other conductive surface from the screen 128 to lock the video card 304 in the desired position. Specifically, removing the at least one finger or other conductive surface from the screen 128 allows the participant to position or move the computing device 106 without changing the size of the video card 304 within the graphical environment 310.

In some implementations, the participant may place the at least one finger 402 or other conductive surface on the screen 128 of the computing device 106 and rotate the at least one finger 402 in a circular direction to enable rotation, parallel to a vertical axis, of the vertical card 304 rendered in the graphical environment 310.

Figure 6:
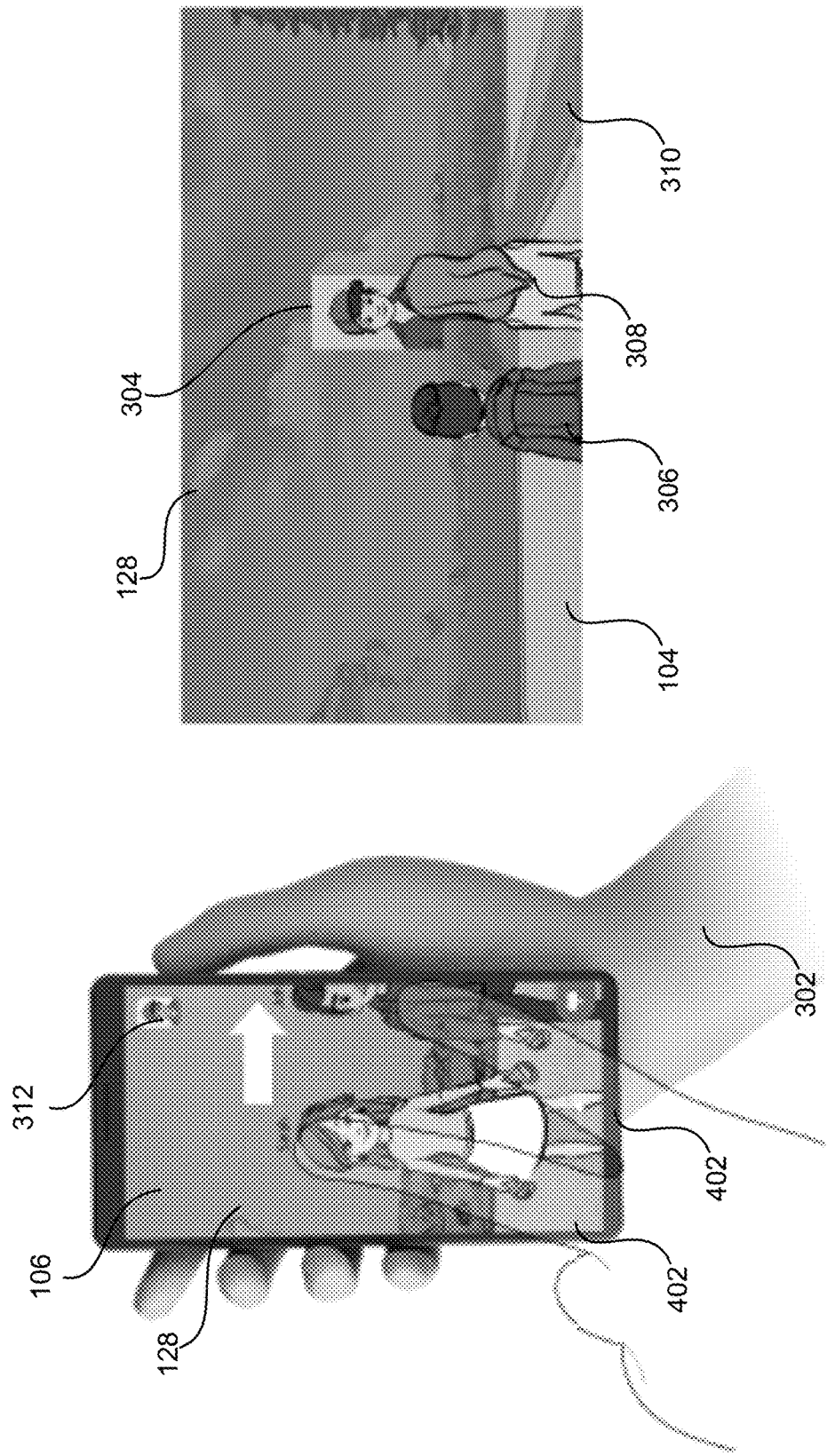
FIG. 6 illustrates yet another exemplary remote view manipulation of a stream rendered within the graphical environment illustrated in FIG. 3.

FIG. 6 illustrates yet another exemplary remote view manipulation of a stream rendered within the graphical environment 310 illustrated in FIG. 3. Specifically, FIG. 6 illustrates that the participant associated with the ongoing communication session 104 is using their computing device 106 to cause the video card 304 to change position within the graphical environment 310. As shown in FIG. 6, the video card 304 has been made to shift laterally, compared to the video card 304 illustrated in FIG. 3. In a similar fashion, the video card 304 may be shifted in other directions, such as vertically and/or diagonally within the graphical environment 310. Therefore, a point of view of the video card 304 has changed.

In this example, to cause the video card 304 to change position within the graphical environment 310, the participant places at least two fingers 402 or other conductive surfaces on the screen 128 of the computing device 106. The participant may then move (i.e., gesture action) the computing device 106 to the right (shown), left, up, down or diagonally to similarly cause the video card 304 to shift in a desired direction. The participant may release or remove the at least two fingers 402 or other two conductive surfaces from the screen 128 to lock the video card 304 at the desired position. Specifically, removing the at least two fingers or other two conductive surfaces from the screen 128 allows the participant to position or move the computing device 106 without changing the position of the video card 304 within the graphical environment 310.

Figure 7:
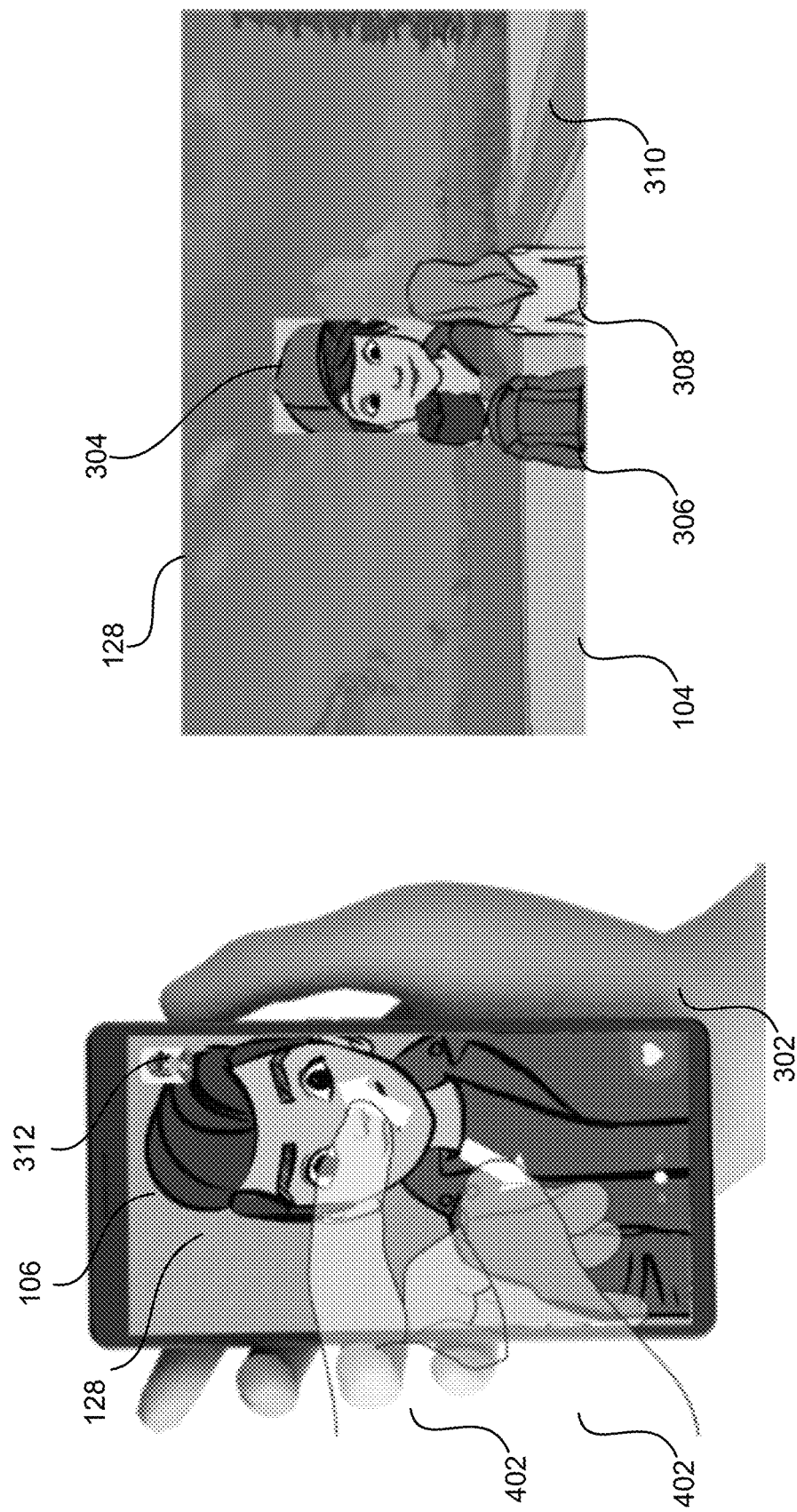
FIG. 7 illustrates another exemplary remote view manipulation of a stream rendered within the graphical environment illustrated in FIG. 3.

FIG. 7 illustrates yet another exemplary remote view manipulation of a stream rendered within the graphical environment 310 illustrated in FIG. 3. Specifically, FIG. 7 illustrates that the participant associated with the ongoing communication session 104 is using their computing device 106 to cause the video card 304 to appear in a zoomed in position within the graphical environment 310. Therefore, a point of view of the video card 304 has changed. In a similar fashion, the video card 304 may be made to zoom out within the graphical environment 310.

In this example, to cause the video card 304 to appear in a zoomed in or a zoomed out position within graphical environment 310, the participant places at least two fingers 402 or other conductive surfaces on the screen 128 of the computing device 106. The participant may then slide the at least two fingers 402, or other conductive surfaces, in an outward motion on the screen 128 of the computing device 106 to cause the video card 304 to zoom in or enlarge (as illustrated). Similarly, the participant may slide the at least two fingers, or other conductive surfaces, in an inward motion on the screen 128 of the computing device 106 to cause the video card 304 to zoom out or shift to a smaller rendering. The participant may disengage the at least two fingers 402 or other conductive surfaces on the screen 128 of the computing device 106 to fix a desired zoomed in or zoomed out rendering of the video card 304 within the environment 310.

Figure 8:
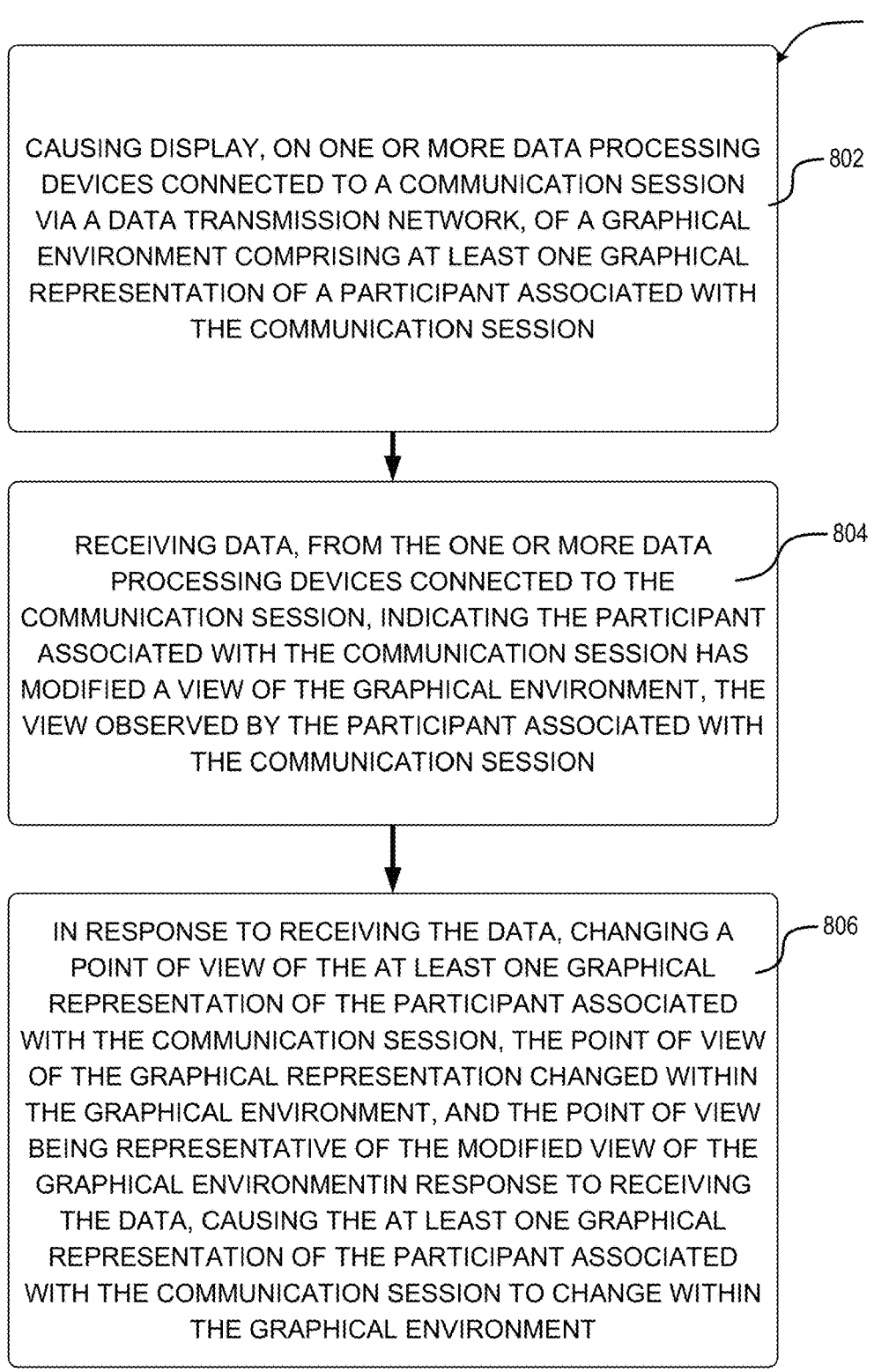
FIG. 8 is a diagram of an example flowchart that illustrates operations associated enabling remote view manipulation of a rendering within a graphical environment.

FIG. 8 illustrates an example flowchart. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., system 102, device 110, client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 can be implemented in association with the example presentation GUIs and components described above with respect to FIGS. 1-7. For instance, the various device(s) and/or module(s) in FIGS. 1 and/or 2 can generate, transmit, receive, and/or display data associated with content of a communication session (e.g., live content, recorded content, etc.) and/or a presentation GUI that includes display of one or more participants, avatars, and/or applications associated with a communication session.

FIG. 8 is a diagram of an example flowchart 800 that illustrates operations associated enabling remote view manipulation of a rendering within a graphical environment. In one example, the operations of FIG. 8 can be performed by components of the system 102, environment 100, a client computing device 106, and/or device 200. Specifically, in some implementations, server-side components, such as the device(s) 110 and/or the system 102 enable the remote view manipulation of a rendering within a graphical environment based on information and/or data received from one or more computing devices 106 operated by one or more participants associated with a communication session 104. Similarly, in some implementations, client side components, such as one or more computing devices 106, enable the remote view manipulation of a rendering (e.g., the video card 304) within a graphical environment based on information and/or data received from one or more computing devices 106 operated by one or more participants associated with a communication session 104. Therefore, the instructions associated with the example flowchart 800 may be execute by one or more processors associated with server-side components and/or client-side components.

At operation 802, one or more components of the environment 100 may cause the display of a graphical environment comprising at least one graphical representation of a participant associated with a communication session. For example, one or more components of the environment 100 may cause the display the graphical environment 310 on one or more computing devices 106. The graphical environment 310 may be associated with a communication session 106. The at least one graphical representation may be the video card 304. The video card 304 may be rendered to float or hover within the graphical environment 310.

At operation 804, one or more components of the environment 100 may receive data indicating a participant associated with the communication session has modified their view of the graphical environment. For example, one or more components of the environment 100 may receive data indicating the participant has interfaced with a computing device 106 to cause the video card 304 rendered within the graphical environment 310 to undergo a change. Specifically, a point of view of the video card 304 may be caused to change by way of participant interaction with the computing device 106. For example, as discussed herein, a participant may use touch and/or movement associated with the computing device 106 to cause the video card 304 rendered within the graphical environment 310 to undergo a change (e.g., shift, zoom in, zoom out, etc.). The received data may include information related to the one or more actions made by the participant to cause the video card 304 rendered within the graphical environment 310 to undergo a change. The data may be used by components of the environment 100, for example server-side components and/or client-side components, to change the manner in which the video card 304 is rendered within the graphical environment 310.

At operation 806, one or more components of the environment 100 may cause the at least one graphical representation of the participant associated with the communication session to change within the graphical environment. For example, based on one or more touch and/or gestures made by a participant interfacing with a computing device 106, server-side components and/or client-side components of the environment 100 may convey and execute instructions to cause a desired rendering of the video card 304 within the graphical environment 310.

EXAMPLE CLAUSES

The disclosure presented herein may be considered in view of the following clauses.

Example clause 1. A computer implemented method, comprising: causing display, on one or more data processing devices connected to a communication session via a data transmission network, of a graphical environment comprising at least one graphical representation of a participant associated with the communication session; receiving data, from the one or more data processing devices connected to the communication session, indicating the participant associated with the communication session has modified a view of the graphical environment, the view observed by the participant associated with the communication session; and in response to receiving the data, changing a point of view of the at least one graphical representation of the participant associated with the communication session, the point of view of the graphical representation changed within the graphical environment, and the point of view being representative of the modified view of the graphical environment.

Example clause 2. The computer implemented method according clause 1, wherein the graphical environment comprises a three-dimensional graphical environment provided by a head mounted display device to provide mixed reality graphical environments comprising virtual reality and/or augmented reality environments.

Example clause 3. The computer implemented method according to any of the preceding clauses, wherein the data indicating the participant associated with the communication session has modified their view of the graphical environment comprises participant touch data and/or gesture data collected by the one or more data processing devices in response to the participant modifying their view of the graphical environment.

Example clause 4. The computer implemented method according to any of the preceding clauses, wherein the participant touch data comprises data collected by the one or more data processing devices in response to one or more finger movements detected on a display of the one or more data processing devices.

Example clause 5. The computer implemented method according to clause 3, wherein the gesture data comprises data collected by the one or more data processing devices in response to a combination of a finger touch detected on a display of the one or more data processing devices and a subsequent movement of the one or more data processing devices.

Example clause 6. The computer implemented method according to any of the preceding clauses, wherein the graphical environment is a three-dimensional graphical environment and the at least one graphical representation of the participant associated with the communication session is a video card suspended or hovering within the three-dimensional graphical environment.

Example clause 7. The computer implemented method according to clause 6, wherein changing the point of view of the video card suspended or hovering within the three-dimensional graphical environment comprises at least one of causing the video card suspended or hovering within the three-dimensional environment to pivot, enlarge, shrink, and/or shift laterally left or right.

Example clause 8. The computer implemented method according to clause 6, wherein the video card comprises an image of the participant associated with the communication session.

Example clause 9. A system, comprising: one or more processors; and a computer-readable medium having encoded thereon computer-executable instructions to cause the one or more processors to: cause display, on one or more data processing devices connected to a communication session via a data transmission network, of a graphical environment comprising at least one graphical representation of a participant associated with the communication session; receive data, from the one or more data processing devices connected to the communication session, indicating the participant associated with the communication session has modified their view of the graphical environment; and in response to receiving the data, change a point of view of the at least one graphical representation of the participant associated with the communication session, the point of view of the graphical representation changed within the graphical environment.

Example clause 10. The system according to clause 9, wherein the graphical environment comprises a three-dimensional graphical environment provided by a head mounted display device to provide mixed reality graphical environments comprising virtual reality and/or augmented reality environments.

Example clause 11. The system according to any of the preceding clauses 9 and 10, wherein the data indicating the participant associated with the communication session has modified their view of the graphical environment comprises participant touch data and/or gesture data collected by the one or more data processing devices in response to the participant modifying their view of the graphical environment.

Example clause 12. The system according to clause 11, wherein the participant touch data comprises data collected by the one or more data processing devices in response to one or more finger movements detected on a display of the one or more data processing devices.

Example clause 13. The system according to clause 11, wherein the gesture data comprises data collected by the one or more data processing devices in response to a combination of a finger touch detected on a display of the one or more data processing devices and a subsequent movement of the one or more data processing devices.

Example clause 14. The system according to any of the preceding clauses 9-13, wherein the graphical environment is a three-dimensional graphical environment and the at least one graphical representation of the participant associated with the communication session is a video card suspended or hovering within the three-dimensional graphical environment.

Example clause 15. The system according to clause 14, wherein changing the point of view of the video card suspended or hovering within the three-dimensional graphical environment comprises at least one of causing the video card suspended or hovering within the three-dimensional environment to pivot, enlarge, shrink, and/or shift laterally left or right.

Example clause 16. The system according to clause 14, wherein the video card comprises an image of the participant associated with the communication session.

Example clause 17. A system, comprising: means to cause display, on one or more data processing devices connected to a communication session via a data transmission network, of a graphical environment comprising at least one graphical representation of a participant associated with the communication session; means to receive data, from the one or more data processing devices connected to the communication session, indicating the participant associated with the communication session has modified their view of the graphical environment; and in response to receiving the data, means to cause the at least one graphical representation of the participant associated with the communication session to change within the graphical environment.

Example clause 18. The system according to clause 17, wherein the data indicating the participant associated with the communication session has modified their view of the graphical environment comprises participant touch data and/or gesture data collected by the one or more data processing devices in response to the participant modifying their view of the graphical environments.

Example clause 19. The system according to any of the preceding clauses 17-18, wherein the graphical environment is a three-dimensional graphical environment and the at least one graphical representation of the participant associated with the communication session is a video card suspended or hovering within the three-dimensional graphical environment.

Example clause 20. The system according to clause 19, wherein the change associated with the video card suspended or hovering within the three-dimensional graphical environment comprises at least one of causing the video card suspended or hovering within the three-dimensional environment to pivot, enlarge, shrink, and/or shift laterally left or right.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to allow participants of a communication session to alter or change representative renderings of video cards, video streams, avatars, images, and the like, using computing devices. The implementations described herein allow a participant to remotely change their representative rendering within a graphical environment using a computing device. One technical benefit of allowing a participant to remotely change the representative rendering within a graphical environment is that other participants viewing the graphical environment may develop an understanding of how the participant that remotely changed their representative rendering is interfacing with the graphical environment and/or participants involved in the communication session associated with the graphical environment. Other technical benefits not specifically identified herein can also be realized through implementations of the disclosed technologies.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
   causing a first display, of a first client device that is associated with a first participant of a communication session, to display a rendering of a graphical card, that corresponds to a second participant of the communication session, within a three-dimensional graphical environment that is associated with the communication session, wherein the three-dimensional graphical environment is defined in relation to at least three axes, and wherein a second graphical representation of the second participant is displayed on a two-dimensional virtual surface, of the graphical card, that is rendered at a particular position and a particular orientation within the three-dimensional graphical environment;
   receiving data that is generated in response to user input received at a second client device that is associated with the second participant, wherein the data indicates that a viewable area of the three-dimensional graphical environment has been adjusted on a second display of the second client device to be directed relatively more or less toward a first graphical representation of the first participant within the three-dimensional graphical environment;
   in response to receiving the data indicating that the viewable area of the three-dimensional graphical environment has been adjusted on the second client device, updating the particular orientation, about a first axis of the at least three axes, at which the two-dimensional virtual surface is rendered within the three-dimensional graphical environment from a previously displayed rotation about the first axis to an updated rotation about the first axis; and
   causing the first display to update the rendering of the three-dimensional graphical environment on the first client device from a first state in which the two-dimensional virtual surface of the graphical card is rendered in accordance with the previously displayed rotation to a second state in which the two-dimensional virtual surface of the video card is rendered in accordance with the updated rotation.

2. The computer implemented method according to claim 1, wherein the three-dimensional graphical environment is provided by a head mounted display device to provide a virtual reality environment and/or an augmented reality environment.

3. The computer implemented method according to claim 1, wherein the data comprises participant touch data and/or gesture data collected by an input device of the second client device in association with the second participant modifying the viewable area of the three-dimensional graphical environment.

4. The computer implemented method according to claim 3, wherein the participant touch data comprises data collected in response to one or more finger movements detected on a touch display of the second client device.

5. The computer implemented method according to claim 3, wherein the gesture data comprises data collected in response to a combination of a finger touch detected on a touch display of the second client device and a subsequent movement of the second client device.

6. The computer implemented method of claim 1, wherein the updated rotation is faced relatively more towards a graphical representation of the first participant than the previously displayed rotation.

7. The computer implemented method of claim 1, wherein the graphical representation, of the second participant, that is displayed on the two-dimensional virtual surface of the video card is a static image associated with the second participant.

8. The computer implemented method of claim 1, wherein the graphical representation, of the second participant, that is displayed on the two-dimensional virtual surface of the video card is a video stream that is being captured by the second client device.

9. A system, comprising:
   one or more processors; and
   a computer-readable medium having encoded thereon computer-executable instructions to cause the one or more processors to:
      cause a first display, of a first client device that is associated with a first participant of a communication session, to display a rendering of a graphical card, that corresponds to a second participant of the communication session, within a three-dimensional graphical environment that is associated with the communication session, wherein the three-dimensional graphical environment is defined in relation to at least three axes, and wherein a second graphical representation of the second participant is displayed on a two-dimensional virtual surface, of the graphical card, that is rendered at a particular position and a particular orientation within the three-dimensional graphical environment;
      receive data that is generated in response to user input received at a second client device that is associated with the second participant, wherein the data indicates that a viewable area of the three-dimensional graphical environment has been adjusted on a second display of the second client device to be directed relatively more or less toward a first graphical representation of the first participant within the three-dimensional graphical environment; and
      in response to receiving the data indicating that the viewable area of the three-dimensional graphical environment has been adjusted on the second client device, update the particular orientation, about a first axis of the at least three axes, at which the two-dimensional virtual surface is rendered within the three-dimensional graphical environment from a previously displayed rotation about the first axis to an updated rotation about the first axis; and cause the first display to update the rendering of the three-dimensional graphical environment on the first client device from a first state in which the two-dimensional virtual surface of the graphical card is rendered in accordance with the previously displayed rotation to a second state in which the two-dimensional virtual surface of the video card is rendered in accordance with the updated rotation.

10. The system according to claim 9, wherein the three-dimensional graphical environment is provided by a head mounted display device.

11. The system according to claim 9, wherein the data comprises participant touch data and/or gesture data collected by the second client device in association with the second participant modifying the viewable area of the graphical environment at the second client device.

12. The system according to claim 11, wherein the participant touch data comprises data collected by the second client device in association with one or more finger movements detected on a touch display.

13. The system according to claim 11, wherein the gesture data comprises data collected by the second client device in association with a combination of a finger touch detected on a touch display of the second client device and a subsequent movement of the second client device.

14. The system according to claim 11, wherein the graphical card comprises an image of the participant associated with the communication session.

15. A system, comprising:
  means to cause a first display, of a first client device that is associated with a first participant of a communication session, to display a rendering of a graphical card, that corresponds to a second participant of the communication session, within a three-dimensional graphical environment that is associated with the communication session, wherein the three-dimensional graphical environment is defined in relation to at least three axes, and wherein a second graphical representation of the second participant is displayed on a two-dimensional virtual surface, of the graphical card, that is rendered at a particular position and a particular orientation relative to a first position at which the first participant is located within the three-dimensional graphical environment;
  means to receive data that is generated in response to user input received at a second client device that is associated with the second participant, wherein the data indicates that a viewable area of the three-dimensional graphical environment has been adjusted on a second display of the second client device to be directed relatively more or less toward a first graphical representation of the first participant within the three-dimensional graphical environment;
  means to update, in response to receiving the data indicating that the viewable area of the three-dimensional graphical environment has changed on the second display, the three-dimensional graphical environment by changing the particular orientation, about a first axis of the at least three axes, at which the two-dimensional virtual surface is rendered, from the first rotation about the first axis and relative to the first position of the first participant to a second rotation about the first axis and relative to the first position of the first participant; and
  means to cause the first display to update the rendering of the three-dimensional graphical environment on the first client device from a first state in which the two-dimensional virtual surface is rendered in accordance with the first rotation to a second state in which the two-dimensional virtual surface is rendered in accordance with the second rotation.

16. The system according to claim 15, wherein the data comprises participant touch data and/or gesture data collected by the second client device in association with the second participant modifying the viewable area of the graphical environments.

17. The system according to claim 15, wherein the three-dimensional graphical environment is generated by way of a head mounted display device.

18. The system according to claim 17, wherein the graphical card is rendered as suspended or hovering within the three-dimensional graphical environment.

* * * * *